(12) United States Patent
Yoon

(10) Patent No.: US 10,346,643 B2
(45) Date of Patent: Jul. 9, 2019

(54) UNIVERSAL SERIAL BUS SECURITY DEVICE USING CRANK-TYPE BIDIRECTIONAL UNIVERSAL SERIAL BUS SOCKET

(71) Applicant: KEPCO ENGINEERING & CONSTRUCTION COMPANY, INC., Gyeongsangbuk-do (KR)

(72) Inventor: Chang Sun Yoon, Gwangmyeong-si (KR)

(73) Assignee: KEPCO ENGINEERING & CONSTRUCTION COMPANY, INC., Gyeongsangbuk-do (KR)

( * ) Notice: Subject to any disclaimer, the term of this patent is extended or adjusted under 35 U.S.C. 154(b) by 0 days.

(21) Appl. No.: 16/108,140

(22) Filed: Aug. 22, 2018

(65) Prior Publication Data

US 2019/0065791 A1 Feb. 28, 2019

(30) Foreign Application Priority Data

Aug. 30, 2017 (KR) .......................... 10-2017-0110346

(51) Int. Cl.
*G06F 21/86* (2013.01)
*G06F 21/83* (2013.01)

(52) U.S. Cl.
CPC .............. *G06F 21/86* (2013.01); *G06F 21/83* (2013.01); *G06F 2213/0042* (2013.01); *H01R 2201/06* (2013.01)

(58) Field of Classification Search
None
See application file for complete search history.

(56) References Cited

U.S. PATENT DOCUMENTS

| 7,104,848 | B1* | 9/2006 | Chou | ............... | G06K 19/07732 |
|---|---|---|---|---|---|
| | | | | | 439/660 |
| 7,628,655 | B1* | 12/2009 | Chen | ................... | H01R 12/721 |
| | | | | | 439/60 |
| 8,096,820 | B2* | 1/2012 | Lyu | ........................ | H01R 27/00 |
| | | | | | 439/141 |
| 9,460,319 | B1* | 10/2016 | Munns | ..................... | G06F 21/86 |
| 2004/0266267 | A1* | 12/2004 | Inaba | ................... | G06K 7/0013 |
| | | | | | 439/630 |
| 2006/0089028 | A1* | 4/2006 | Higham | ............... | H01R 13/447 |
| | | | | | 439/136 |
| 2007/0155203 | A1* | 7/2007 | Shabtai | ..................... | G06F 1/16 |
| | | | | | 439/131 |
| 2009/0227144 | A1* | 9/2009 | Ma | ........................ | H01R 24/62 |
| | | | | | 439/620.15 |

(Continued)

*Primary Examiner* — Truc T Nguyen
(74) *Attorney, Agent, or Firm* — Nixon Peabody LLP; Jeffrey L. Costellia

(57) ABSTRACT

A USB security device includes a main body; a connection line connecting the main body to the control system; a first socket into which a USB having a guard is inserted; a second socket into which a USB not having a guard is inserted; and a key switch. The first socket includes a first slide bar having a first connection terminal at a bottom of an end portion thereof; a first connecting rod; a second slide bar having a second connection terminal at a top of an end portion thereof; a second connecting rod; and a crank coupled at opposite ends to the first connecting rod and the second connecting rod and having a crankshaft.

9 Claims, 8 Drawing Sheets

(56) References Cited

U.S. PATENT DOCUMENTS

| | | | |
|---|---|---|---|
| 2011/0230102 A1* | 9/2011 | Noguchi | H01R 9/032 |
| | | | 439/640 |
| 2011/0256756 A1* | 10/2011 | Lu | H01B 7/0892 |
| | | | 439/449 |
| 2013/0084725 A1* | 4/2013 | Liao | H01R 31/06 |
| | | | 439/170 |
| 2015/0325946 A1* | 11/2015 | Savage | H01R 13/5213 |
| | | | 439/142 |
| 2017/0109547 A1* | 4/2017 | Munns | G06F 21/83 |

* cited by examiner

Case : 1

| No. | Type | Connection | | | | | | |
|---|---|---|---|---|---|---|---|---|
| | | 172 | 121 | 123 | 131 | 133 | 124 | 134 |
| 1 | VCC | ○ | ○ | ○ | × | × | ○ | × |
| 2 | Data − | ○ | ○ | ○ | × | × | ○ | × |
| 3 | Data + | ○ | ○ | ○ | × | × | ○ | × |
| 4 | Ground | ○ | ○ | ○ | × | × | ○ | × |

Case : 2

| No. | Type | Connection | | | | | | |
|---|---|---|---|---|---|---|---|---|
| | | 172 | 121 | 123 | 131 | 133 | 124 | 134 |
| 1 | VCC | ○ | × | × | ○ | ○ | × | ○ |
| 2 | Data − | ○ | × | × | ○ | ○ | × | ○ |
| 3 | Data + | ○ | × | × | ○ | ○ | × | ○ |
| 4 | Ground | ○ | × | × | ○ | ○ | × | ○ |

— : Forward
----- : Reverse

UNIVERSAL SERIAL BUS SECURITY DEVICE USING CRANK-TYPE BIDIRECTIONAL UNIVERSAL SERIAL BUS SOCKET

CROSS-REFERENCE TO RELATED APPLICATION

This application claims the benefit of Korean Patent Application No. 10-2017-0110346, filed on Aug. 30, 2017, in the Korean Intellectual Property Office, the disclosure of which is incorporated herein in its entirety by reference.

BACKGROUND

1. Field

One or more embodiments relate to a universal serial bus (USB) security device using a crank-type bidirectional USB socket, and more particularly, to a USB security device, as an auxiliary device used in a plant control system, for enabling a USB to be inserted into a USB socket, regardless of a direction, by using a crankshaft and for physically blocking a signal using a key switch.

2. Description of the Related Art

A plant control system is constructed based on a personal computer (PC). Such a PC-based control system has vulnerable security through a USB terminal, and therefore, the function of the USB terminal is restricted not to be used physically or electrically after a trial run of a power plant.

However, after the trial run of the power plant, it happens that the USB terminal needs to be used for system upgrade or supplementary work or malfunction of the control system. As described above, although a USB needs to be used during the trial run of the power plant, use of the USB is restricted by limiting access to a PC of the control system or physically or electrically disabling the USB terminal.

In addition, as for a complex control system, even a slight mistake of an operator may affect the operation of the power plant, but operators are often confused about the orientation of a USB. Usually, a USB operates when it is inserted in a particular direction. The USB that needs to be inserted in the particular direction causes operators an inconvenience, and when the USB is inserted by force in a wrong direction, a USB terminal may be damaged and broken.

SUMMARY

One or more embodiments include a universal serial bus (USB) security device using a crank-type bidirectional USB socket, the USB security device as an auxiliary device used in a plant control system enabling a USB to be inserted into a USB socket, regardless of a direction, by using a crankshaft and physically blocking a signal using a key switch.

Additional aspects will be set forth in part in the description which follows and, in part, will be apparent from the description, or may be learned by practice of the presented embodiments.

According to one or more embodiments, a USB security device connectable to a control system includes a main body; a connection line configured to connect the main body to the control system; a first socket into which a USB having a guard protecting a USB terminal is inserted, the first socket being provided in the main body; a second socket into which a USB not having a guard is inserted, the second socket being provided in the main body and being thinner than the first socket; and a key switch configured to control operations of the first socket and the second socket. The first socket includes a first slide bar having a first connection terminal at a bottom of an end portion thereof and being configured to be slidable inside the first socket; a first connecting rod coupled at an end to the first slide bar and extending inside the first socket; a second slide bar having a second connection terminal at a top of an end portion thereof and being configured to be slidable inside the first socket; a second connecting rod coupled at an end to the second slide bar and extending inside the first socket; and a crank coupled at opposite ends to the first connecting rod and the second connecting rod, respectively, and having a crankshaft fixed to a point in a central portion of the crank. The second connecting rod moves in an inward direction of the first socket when the first connecting rod moves in an outward direction of the first socket, and the first connecting rod moves in the inward direction of the first socket when the second connecting rod moves in the outward direction of the first socket.

The second socket may include a third connection terminal in each of upper and lower portions therein, the third connection terminal contacting the USB terminal. The key switch may include a dedicated key configured to control the key switch and a key hole into which the dedicated key is inserted.

A first link terminal may be provided at a top of the first slide bar and electrically connected with the first connection terminal. A second link terminal may be provided at a bottom of the second slide bar and electrically connected with the second connection terminal. A first contact may be provided in an upper portion of the first socket and may contact the first link terminal. A second contact may be provided in a lower portion of the first socket and may contact the second link terminal. The crank may include a first crank bar coupled to the crankshaft at a center thereof and extending in a straight line; and a second crank bar coupled to the crankshaft at a center thereof and provided above the first crank bar. The second crank bar may have opposite portions respectively having a "┐" shape and a "L" shape, and the first or second connecting rod may be coupled to a lower portion of the "┐" shape or an upper portion of the "L" shape.

The first socket may further includes a washer provided at a bottom of the first connecting rod where the first connecting rod is coupled to the first slide bar or at a top of the second connecting rod where the second connecting rod is coupled to the second slide bar. Magnets having different polarities may be respectively provided on opposite side surfaces of the main body, and a plurality of main bodies may be coupled to each other through the magnets.

The key switch may control at least four contacts. The USB security device may further include a cover configured to be slidable between the first socket and the second socket along an outer surface of the main body.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
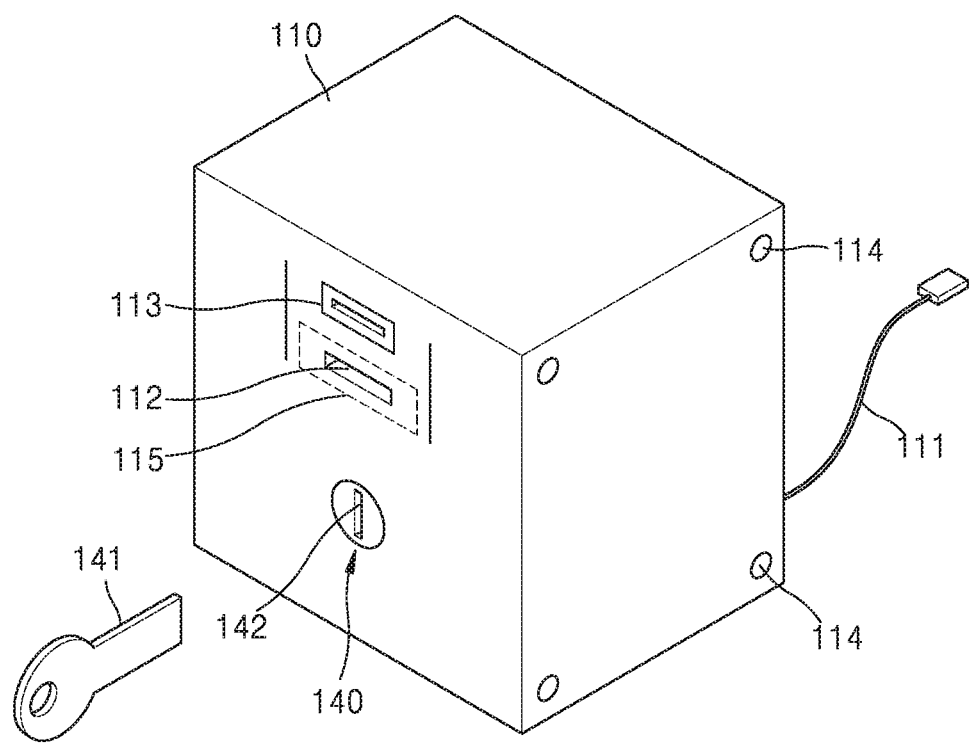
FIG. 1 is a perspective view of a universal serial bus (USB) security device using a crank-type bidirectional USB socket, according to one or more embodiments.

One or more embodiments relate to a universal serial bus (USB) security device using a crank-type bidirectional USB socket, the USB security device enabling a USB to be inserted into a USB socket, regardless of a direction, by using a crankshaft and physically blocking a signal using a key switch.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Referring to FIG. 1, a USB security device using a crank-type bidirectional USB socket includes a main body 110, a connection line 111, a first socket 112, a second socket 113, and a key switch 140.

The main body 110 is a frame in which the first socket 112, the second socket 113, and the key switch 140 may be installed. A circuit for operating the first socket 112, the second socket 113, and the key switch 140 may be installed inside the main body 110. The main body 110 may have a cuboid shape as a basic frame.

The connection line 111 may connect the main body 110 to a control system. The main body 110 is detachable from the control system, which is larger than the main body 110, and portable and is connected to the control system through the connection line 111. The main body 110 may be located in a place a user desires when the main body 110 and the connection line 111 are used.

In detail, a user or an operator of a control system needs to closely watch an operation screen during the operation of a power plant. Accordingly, the main body 110 may be located beside the operation screen. When the main body 110 is located in a place a user desires, the user does not need to travel to the control system to use a USB and may use the USB conveniently.

The control system may be used for, but not limited to, a power plant. For example, the control system may be a personal computer (PC) used for other purposes, and systems using a PC may vary.

Figure 2A:
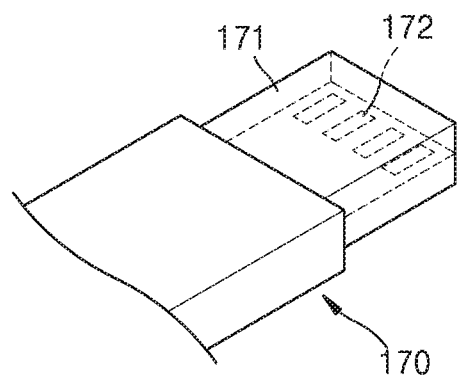
FIG. 2A is a diagram of a USB having a guard.
Figure 2B:
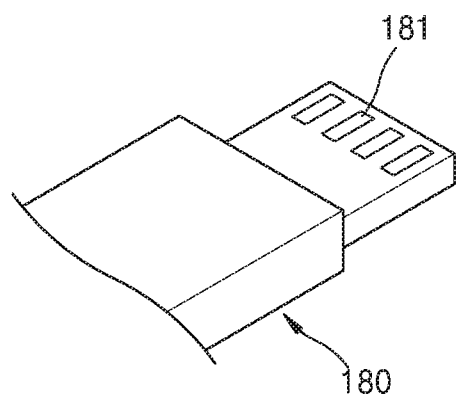
FIG. 2B is a diagram of a USB not having a guard.

The first socket 112 and the second socket 113 allow a USB to be inserted therein. Referring to FIGS. 2A and 2B, there are a USB 170 having a guard 171 protecting a USB terminal 172 and a USB 180 not having a guard protecting a USB terminal 181. The USB 170 having the guard 171 may be inserted into the first socket 112 and the USB 180 not having a guard may be inserted into the second socket 113.

The second socket 113 may be thinner than the first socket 112. Since the guard 171 is not formed in the USB 180, the USB 180 not having a guard is thinner than the USB 170 having the guard 171. Accordingly, the second socket 113 may be formed to be thinner than the first socket 112. When there is a thickness difference between the first socket 112 and the second socket 113, a user may not confuse the first socket 112 with the second socket 113.

A cover 115 is provided in the main body 110 such that a user may selectively use either the first socket 112 or the second socket 113. The cover 115 may slide between the first socket 112 and the second socket 113 along an outer surface of the main body 110.

A user may push the cover 115 to slide to open a socket to be used and close a socket not to be used. For example, to use the first socket 112, a user may push the cover 115 to slide over to the second socket 113 such that the second socket 113 is closed and the first socket 112 is opened. Due to the cover 115, a socket which is not used may be protected.

The key switch 140 is provided in the main body 110 and may control the operations of the first socket 112 and the second socket 113. In detail, a dedicated key 141, which may control the key switch 140, may be provided. The dedicated key 141 may be inserted into a keyhole 142 provided in the key switch 140 and the key switch 140 may be controllable by turning the dedicated key 141.

In other words, when the dedicated key 141 is inserted into the keyhole 142 and turned, the first socket 112 and the second socket 113 may be changed into a usable state or a use restriction state. As described above, use of a USB may be restricted through the dedicated key 141, and only an authorized user may selectively use a USB by using the dedicated key 141.

The USB terminal 172 has four contacts, and therefore, the key switch 140 may be configured to control at least four contacts. However, when the key switch 140 controls at most three contacts, the operations of the first socket 112 and the second socket 113 may be controlled by blocking a contact involved in signal transmission among the four contacts.

The key switch 140 is not limited to the description above and may be any device that can control the operations of the first socket 112 and the second socket 113. For example, the key switch 140 may be configured with a password, and the operations of the first socket 112 and the second socket 113 may be controlled by entering the password.

Figure 3:
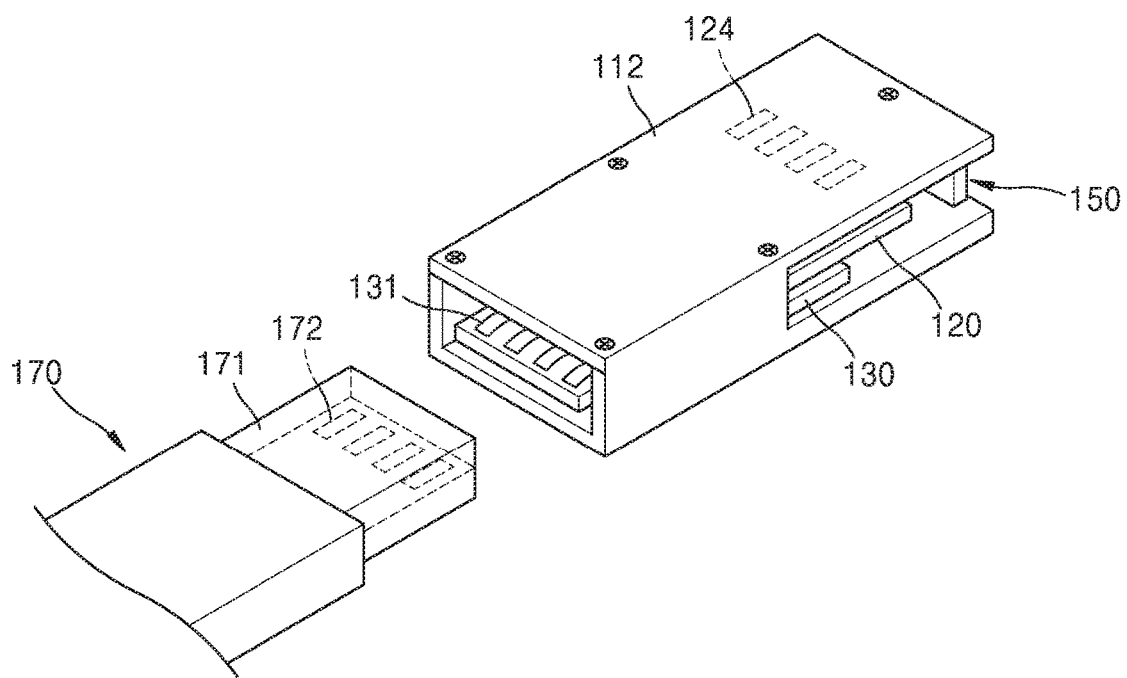
FIG. 3 is a diagram of a first socket according to one or more embodiments.
Figure 4:
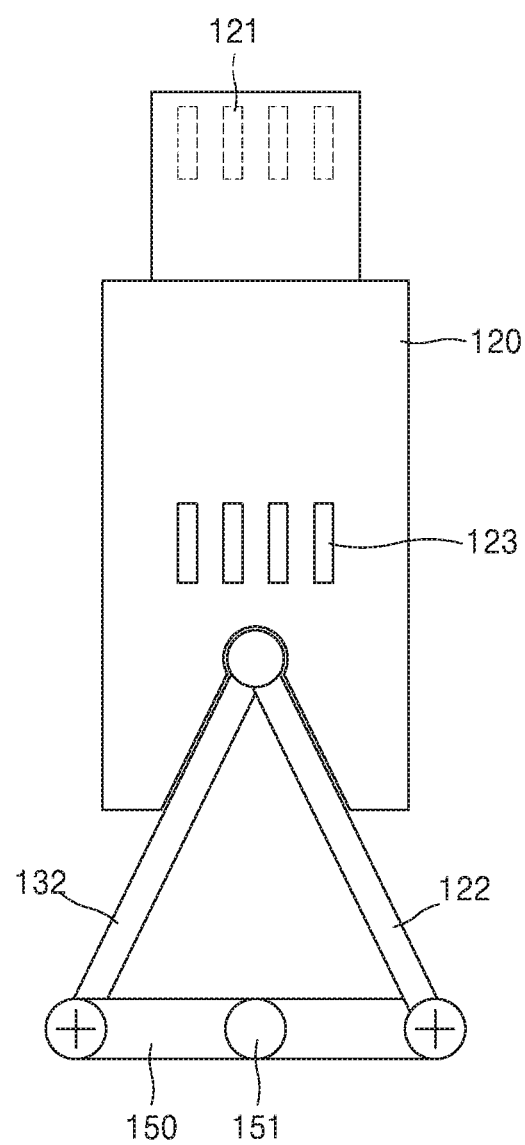
FIG. 4 is a top view of the interior of a first socket, according to one or more embodiments.

Referring to FIGS. 3 and 4, a first slide bar 120, a second slide bar 130, a first connecting rod 122, a second connecting rod 132, and a crank 150 may be provided in the first socket 112, and therefore, the USB 170 having the guard 171 may be inserted into the first socket 112, regardless of orientation.

A first connection terminal 121 is provided at a bottom of an end portion of the first slide bar 120. The first slide bar 120 may perform a sliding movement in the first socket 112. The second slide bar 130 is provided below the first slide bar 120. A second connection terminal 131 is provided at a top of an end portion of the second slide bar 130. The second slide bar 130 may also perform a sliding movement in the first socket 112.

Referring to FIG. 4, the first connecting rod 122 extends inside the first socket 112, and an end of the first connecting rod 122 is coupled to the first slide bar 120. The first connecting rod 122 delivers a force to the first slide bar 120 and has a rod shape.

The second connecting rod 132 extends inside the first socket 112, and an end of the second connecting rod 132 is coupled to the second slide bar 130. The second connecting rod 132 delivers a force to the second slide bar 130 and has a rod shape. In other words, the first slide bar 120 and the first connecting rod 122 are provided in an upper portion inside the first socket 112 and the second slide bar 130 and the second connecting rod 132 are provided in a lower portion inside the first socket 112, so that a pair of the first slide bar 120 and the first connecting rod 122 and a pair of the second slide bar 130 and the second connecting rod 132 are arranged in a vertical direction.

The first connecting rod 122 is connected with the second connecting rod 132 through the crank 150. The crank 150 has a crankshaft 151 in a central portion thereof. Opposite ends of the crank 150 are respectively coupled to the first connecting rod 122 and the second connecting rod 132.

Figure 5A:
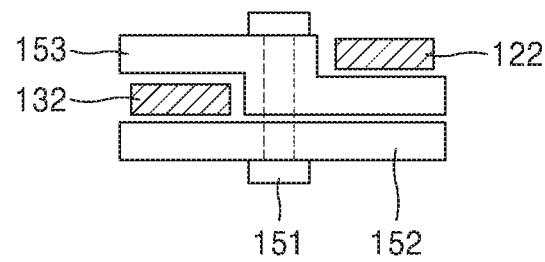
FIG. 5A is a diagram of a crank according to one or more embodiments.
Figure 5B:
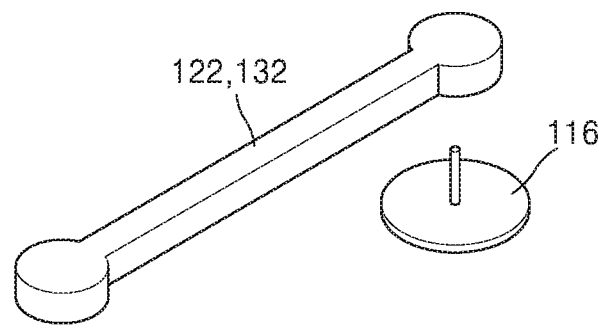
FIG. 5B is a diagram of a first or second connecting rod according to one or more embodiments.

In detail, referring to FIGS. 4 and 5A, the crankshaft 151 is fixed to a certain point, and the crank 150 may rotate around the crankshaft 151. The first connecting rod 122 and the second connecting rod 132 respectively at the opposite ends of the crank 150 may be moved forward or backward by the rotation of the crank 150.

In other words, rotational motion of the crank 150 is converted into rectilinear motion of the first connecting rod 122 and the second connecting rod 132. Accordingly, when the first connecting rod 122 moves forward, i.e., in an outward direction of the first socket 112, the second connecting rod 132 moves backward, i.e., in an inward direction of the first socket 112. When the first connecting rod 122 moves backward, i.e., in the inward direction of the first socket 112, the second connecting rod 132 moves forward, i.e., in the outward direction of the first socket 112.

Referring to FIG. 5A, the crank 150 may include a first crank bar 152 and a second crank bar 153. The first crank bar 152 is coupled to the crankshaft 151 at a center thereof and extends in a straight line. The second crank bar 153 may be provided above the first crank bar 152.

The crankshaft 151 is coupled to the center of the second crank bar 153. Opposite portions of the second crank bar 153 have different shapes from each other. In detail, one of the opposite portions of the second crank bar 153 has a "⌐" shape and the other portion has a "L" shape. A straight portion extending downward in the "⌐" shape is connected to a straight portion extending upward in the "L" shape.

The first connecting rod 122 or the second connecting rod 132 may be coupled to a lower portion of the "⌐" shape or an upper portion of the "L" shape. In other words, the second connecting rod 132 may be coupled between the lower portion of the "⌐" shape and the first crank bar 152, and the first connecting rod 122 may be coupled to the upper portion of the "L" shape. Since the second crank bar 153 has the shape described above, the first connecting rod 122 and the second connecting rod 132 may be spatially separated from each other and thus prevented from interfering with each other.

Referring to FIGS. 5B through 6B, a washer 116 may be provided at a bottom of the first connecting rod 122, where the first connecting rod 122 is coupled to the first slide bar 120, or at a top of the second connecting rod 132, where the second connecting rod 132 is coupled to the second slide bar 130. The washer 116 prevents the first and second connecting rods 122 and 132, which move in different directions from each other, from interfering with each other. The washer 116 also spatially separates the first slide bar 120 from the second slide bar 130, so that interference between the first slide bar 120 and the second slide bar 130 is prevented.

An operation in which the USB 170 having the guard 171 may be inserted into the first socket 112, regardless of orientation, will be described below.

Figure 6A:
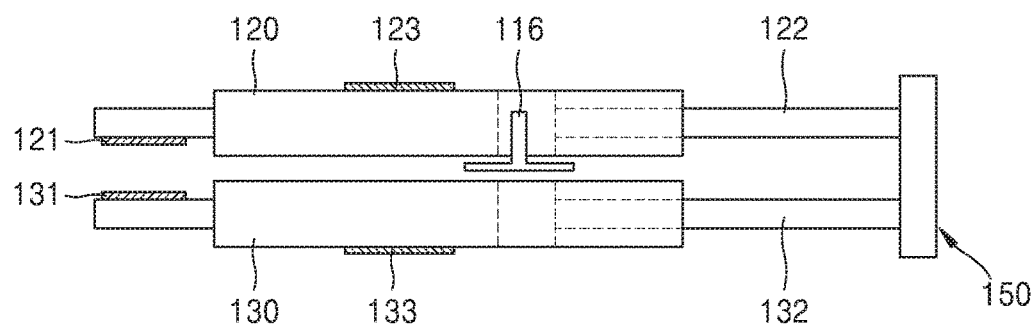
FIGS. 6A and 6B are each side views of the interior of a first socket, according to one or more embodiments.

Referring to FIG. 6A, a first link terminal 123 is electrically connected with the first connection terminal 121 and is provided at a top surface of the first slide bar 120. A second link terminal 133 is electrically connected with the second connection terminal 131 and is provided at a bottom surface of the second slide bar 130.

Figure 6B:
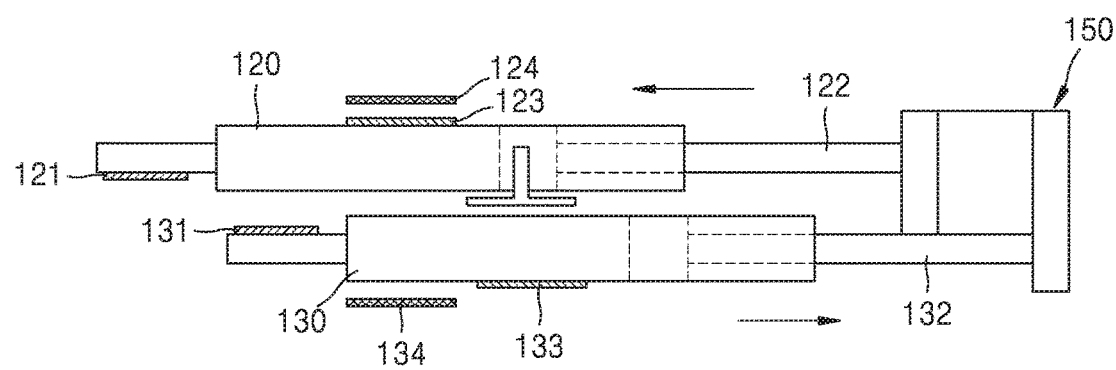

Referring to FIGS. 3 and 6B, a first contact 124 is provided in an upper portion of the first socket 112 and contacts the first link terminal 123, and a second contact 134 is provided in a lower portion of the first socket 112 and contacts the second link terminal 133. In detail, the first contact 124 is provided in the upper portion inside the first socket 112, and the second contact 134 is provided in the lower portion inside the first socket 112. The first contact 124 and the second contact 134 are connected to the key switch 140 and the connection line 111.

Even when the USB 170 having the guard 171 is inserted into the first socket 112, regardless of orientation, a portion of the USB 170 provided with the USB terminal 172 pushes the first slide bar 120 or the second slide bar 130 and is thus inserted into the first socket 112.

Referring back to FIGS. 3 and 6B, the USB terminal 172 is positioned in a lower portion and pushes the second slide bar 130 inward. When the second slide bar 130 is pushed backward, i.e., in the inward direction of the first socket 112, the first slide bar 120 moves forward, i.e., in the outward direction of the first socket 112, and therefore, the USB terminal 172 is in contact with the first connection terminal 121. Since the first connection terminal 121 is electrically connected with the first link terminal 123, when the first link terminal 123 is in contact with the first contact 124, the USB 170 having the guard 171 becomes to operate.

Even when the USB 170 having the guard 171 is inserted in an upside down direction, the USB 170 becomes to operate based on the same principle as described above. In other words, when the USB terminal 172 is positioned in an upper portion, the USB terminal 172 pushes the first slide bar 120 inward and the second slide bar 130 moves forward, and therefore, the USB 170 having the guard 171 becomes to operate through contact among the USB terminal 172, the second connection terminal 131, the second link terminal 133, and the second contact 134.

Figures 7, 8:
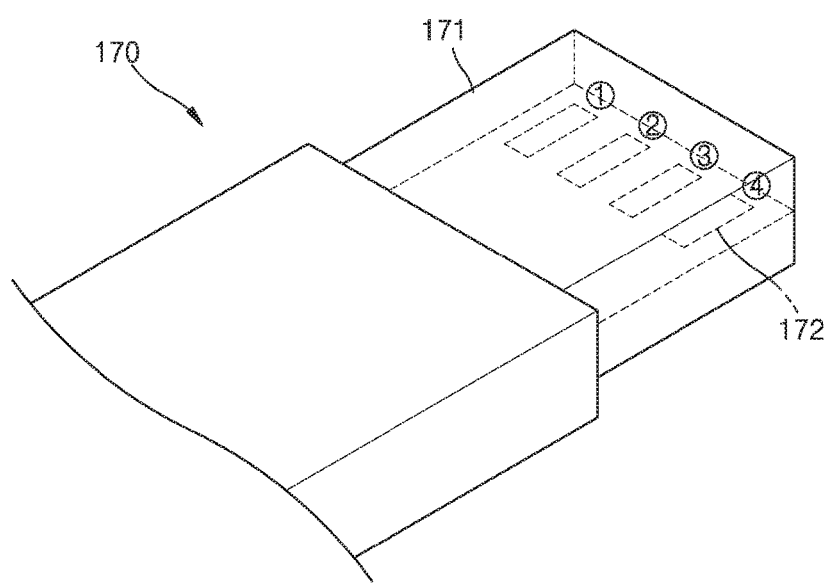
FIG. 7 is a diagram of connections of a USB having a guard, according to one or more embodiments.
FIG. 8 is a diagram of USB terminal numbers of a USB having a guard.

FIG. 7 shows electrical connections in two cases in which the USB terminal 172 is inserted in different directions. For convenience's sake, elements are denoted by only reference numerals without names.

A USB has four contacts, as shown in FIG. 8. The four contacts are respectively denoted by Nos. 1, 2, 3, and 4 in FIG. 7. When the USB terminal 172 is positioned in the lower portion, the USB terminal 172 has the contacts Nos. 1, 2, 3, and 4 in order from the left, as shown in FIG. 8. However, when the USB terminal 172 is positioned in the upper portion, the order of the numbers of the contacts is reversed. In other words, contact No. 1 when the USB terminal 172 is positioned in the lower portion is placed at position of contact No. 4 when the USB terminal 172 is positioned in the upper portion.

Figure 9:
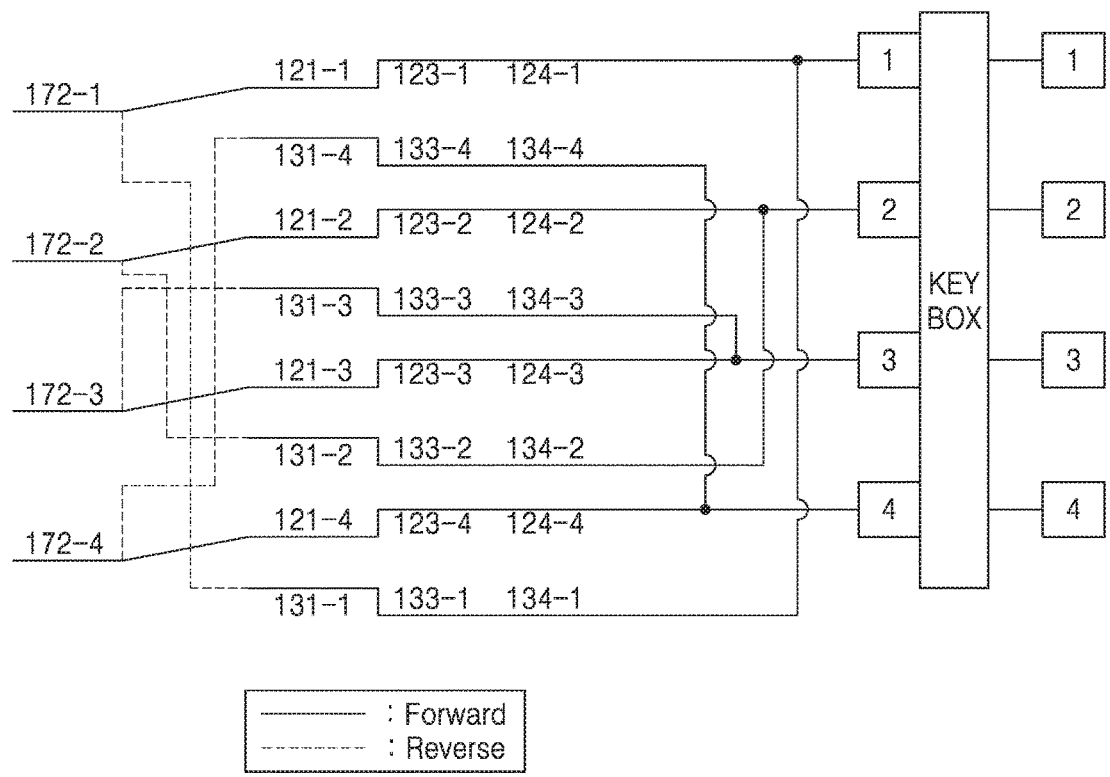
FIG. 9 a circuit diagram of the connections of a USB having a guard, according to one or more embodiments.

Considering that the order of the numbers of contacts is reversed between when the USB terminal 172 is positioned in the upper portion and when the USB terminal 172 is positioned in the lower portion, a circuit may be configured as shown in FIG. 9, in which "forward" indicates a case where the USB terminal 172 is positioned in the lower portion and pushes the second slide bar 130 and "reverse" indicates a case where the USB terminal 172 is positioned in the upper portion and pushes the first slide bar 120. For convenience's sake, elements are denoted by only reference numerals without names. Reference numeral 121-1 denotes contact No. 1 of the first connection terminal 121, and such a rule is applied to other reference numerals 123-1 through 172-4. When the circuit is configured as shown in FIG. 9, the USB 170 having the guard 171 may become to normally operate, regardless of whether the USB 170 is inserted in a normal direction or an upside down direction.

Figure 10:
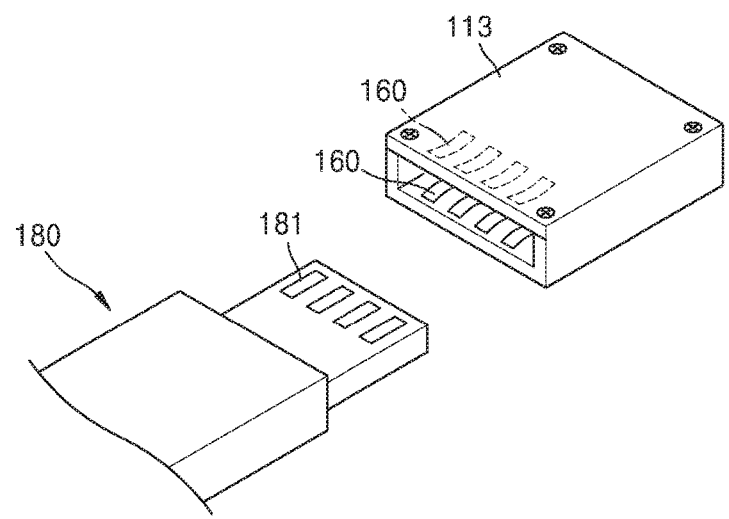
FIG. 10 is a diagram of a second socket according to one or more embodiments.

Referring to FIG. 10, a third connection terminal 160 may be provided in each of upper and lower portions inside the second socket 113 and may contact the USB terminal 181 of the USB 180 not having a guard. As described above, the USB 180 not having a guard may be inserted into the second socket 113. Since the USB 180 does not have a guard, the USB 180 is thinner than the USB 170 having the guard 171.

Since the third connection terminal 160 contacting the USB terminal 181 is provided in each of the upper and lower portions inside the second socket 113, the USB 180 not having a guard may be inserted into the second socket 113, regardless of orientation. When the USB terminal 181 of the USB 180 not having a guard is positioned in a lower portion, the USB terminal 181 contacts the third connection terminal 160 provided in the upper portion inside the second socket 113. When the USB terminal 181 of the USB 180 not having a guard is positioned in an upper portion, the USB terminal 181 contacts the third connection terminal 160 provided in the lower portion inside the second socket 113.

A user may use the first socket 112 when using the USB 170 having the guard 171 and use the second socket 113 when using the USB 180 not having a guard.

A plurality of main bodies 110 may be coupled to each other. In this case, a plurality of first sockets 112 and a plurality of second sockets 113 may be used. In detail, magnets 114 having different polarities may be provided in opposite side surfaces of each main body 110, respectively. A side surface of one main body 110 may be coupled to a side surface of another main body 110 through the magnets 114 having different polarities. As described above, the main body 110 may be used as a portable auxiliary device, and when a plurality of main bodies 110 are coupled to each other, utilization may be increased.

According to one or more embodiments, a USB security device using a crank-type bidirectional USB socket has the effects described below.

Since a crankshaft is used to allow a USB to be inserted into a socket regardless of a direction, a user may insert the USB into the socket without concern about the direction. In particular, damage to a USB terminal, which may occur due to confusion about the insertion direction of the USB, may be prevented. In an environment in which even a slight mistake affects the operation of a power plant, a user may be prevented from making a mistake in using a USB. In addition, since a first socket and a second socket are provided, both a USB having a guard and a USB not having a guard may be used, regardless of orientation.

When a USB terminal is damaged while a user directly uses the USB terminal in a plant control system according to the related art, it is hard for the user to change or repair the plant control system. However, according to one or more embodiments, a main body is provided separately from a plant control system and is connected to the plant control system through a connection line, and therefore, a terminal of the plant control system may be prevented from being damaged, and when a terminal of the main body is damaged, it may be easily repaired.

In addition, according to one or more embodiments, a signal is physically blocked using a key switch, so that only an authorized person may be permitted access. As a result, efficient security management may be accomplished.

While operators need to carefully watch an operation screen all the time in a power plant, a USB socket according to the related art is provided in a plant control system which is difficult to access. However, according to one or more embodiments, a main body may be connected to a plant control system through a connection line and located in a place a user desires, so that the user may insert a USB into the main body at the desired place. For example, when the main body is located beside a monitor, the user may perform USB-related tasks while watching the operation screen.

It has been described that one or more embodiments are used in a control system of a power plant, but one or more embodiments are not limited thereto. For example, the control system may be any one of various systems using a PC, and one or more embodiments may be used in normal PC equipment using a USB.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:
1. A universal serial bus (USB) security device which is connectable to a control system, the USB security device comprising:
a main body;
a connection line configured to connect the main body to the control system;
a first socket into which a USB having a guard protecting a USB terminal is inserted, the first socket being provided in the main body;
a second socket into which a USB not having a guard is inserted, the second socket being provided in the main body and being thinner than the first socket; and
a key switch configured to control operations of the first socket and the second socket,
wherein the first socket comprises:
a first slide bar having a first connection terminal at a bottom of an end portion thereof and being configured to be slidable inside the first socket;
a first connecting rod coupled at an end to the first slide bar and extending inside the first socket;
a second slide bar having a second connection terminal at a top of an end portion thereof and being configured to be slidable inside the first socket;
a second connecting rod coupled at an end to the second slide bar and extending inside the first socket; and
a crank coupled at opposite ends to the first connecting rod and the second connecting rod, respectively, and having a crankshaft fixed to a point in a central portion of the crank, wherein the second connecting rod moves in an inward direction of the first socket when the first connecting rod moves in an outward direction of the first socket, and the first connecting rod moves in the inward direction of the first socket when the second connecting rod moves in the outward direction of the first socket.

2. The USB security device of claim 1, wherein the second socket comprises a third connection terminal in each of upper and lower portions therein, the third connection terminal contacting the USB terminal.

3. The USB security device of claim 1, wherein the key switch comprises:
   a dedicated key configured to control the key switch; and
   a key hole into which the dedicated key is inserted.

4. The USB security device of claim 1, wherein a first link terminal is provided at a top of the first slide bar and is electrically connected with the first connection terminal,
   a second link terminal is provided at a bottom of the second slide bar and is electrically connected with the second connection terminal,
   a first contact is provided in an upper portion of the first socket and contacts the first link terminal, and
   a second contact is provided in a lower portion of the first socket and contacts the second link terminal.

5. The USB security device of claim 1, wherein the crank comprises:
   a first crank bar coupled to the crankshaft at a center thereof and extending in a straight line; and
   a second crank bar coupled to the crankshaft at a center thereof and provided above the first crank bar,
   wherein the second crank bar has opposite portions respectively having a "┐" shape and a "L" shape, and the first or second connecting rod is coupled to a lower portion of the "┐" shape or an upper portion of the "L" shape.

6. The USB security device of claim 1, wherein the first socket further comprises a washer provided at a bottom of the first connecting rod where the first connecting rod is coupled to the first slide bar or at a top of the second connecting rod where the second connecting rod is coupled to the second slide bar.

7. The USB security device of claim 1, wherein magnets having different polarities are respectively provided on opposite side surfaces of the main body, and a plurality of main bodies are coupled to each other through the magnets.

8. The USB security device of claim 1, wherein the key switch controls at least four contacts.

9. The USB security device of claim 1, further comprising a cover configured to be slidable between the first socket and the second socket along an outer surface of the main body.

* * * * *